Patented June 5, 1928.

1,672,630

UNITED STATES PATENT OFFICE.

CHARLES J. THATCHER, OF NEW YORK, N. Y.

PROCESS OF PURIFYING CARBAZOLE.

No Drawing. Application filed December 15, 1921. Serial No. 522,630.

The invention relates to a process for purifying impure carbazole, particularly such as has been derived from crude anthracene.

The object of the invention is to provide a convenient and economical means for removing impurities such as anthracene, phenanthrene, or other similar compounds from impure carbazole and which usually accompany it in products, such as crude anthracene, from which it is derived.

At the present time, few, if any, methods for commercially preparing carbazole of high purity are known. Methods have been described or patented which involve the use of concentrated sulphuric acid for removal of anthracene from carbazole; but such methods necessarily occasion loss of all the anthracene and of some of the carbazole itself by sulphonation of these compounds.

It has been stated in the literature that it is impossible to completely separate compounds, such as anthracene, from carbazole by the use of solvents. Such statements I find, however, to be erroneous, as by the solvent method hereinafter described, I have been enabled to separate anthracene and phenanthrene from carbazole, obtaining the latter in a purity of 99.6 per cent.

I have found that impure carbazole, i. e. such as contains anthracene or phenanthrene, or both, can be purified by treating the carbazole with a sufficient quantity of a suitable solvent to dissolve, at the temperature of the solvent used, all the anthracene or phenanthrene contained in the mixture and only a minor proportion of the carbazole itself.

For example, if a mixture of carbazole with anthracene and phenanthrene in minor proportions, be treated with a sufficient quantity of warm carbon tetrachloride to dissolve all of these impurities and be then filtered and then washed with the same solvent, all of the carbazole, excepting such as has incidentally been dissolved by the carbon tetrachloride, remains in a high state of purity. Carbazole is itself much less soluble in carbon tetrachloride than either anthracene or phenanthrene. Thus, one hundred parts of carbon tetrachloride will will dissolve, at 50° C., .30 parts carbazole, 1.30 parts of anthracene, and approximately 15 parts of phenanthrene.

If, therefore, one hundred parts of impure carbazole containing ninety (90%) per cent, say, of carbazole and ten (10%) per cent of anthracene or phenanthrene, either or both, be heated with eight to ten hundred parts of carbon tetrachloride to 50° C., all of the anthracene and phenanthrene, but only three parts, at the most, of carbazole will dissolve. It follows that about eighty-seven (87) out of the ninety (90) parts of the carbazole in the one hundred (100) parts of ninety (90%) per cent carbazole used, will remain undissolved.

The solution of the ten parts of impurities is then filtered off at or about that temperature, viz: 50° C., and washed with smaller quantities of the carbon tetrachloride to remove any solution remaining. This treatment can be repeated, if found necessary. In this manner, I have prepared carbazole of 99.6 per cent purity.

On cooling the aforesaid solution of anthracene, phenanthrene, carbazole, etc., a portion, at least, of these compounds crystallize out. Such crystals are added to the next batch of crude anthracene before obtaining therefrom crude carbazole by other separation methods, such as well-known solvent or caustic alkali methods. Any loss of the aforesaid compounds is thereby avoided. The cooled carbon tetrachloride is then used again, as before, for a second purification of the next lot of crude carbazole. When any lot of carbon tetrachloride becomes impure from repeated uses, it can be distilled and all solid residues similarly added to the aforesaid preliminary separations of carbazole.

By this method ten (10%) per cent, twenty (20%) per cent or more of anthracene or phenanthrene can be separated from impure carbazole, carrying along only a minor proportion of the carbazole in each purification, but leaving the bulk of the purification, but leaving the bulk of the cabazole in a high state of purity. None of these compounds, however, are lost because they are all restored to the crude material in preliminary operations.

It will be understood that other suitable solvents for anthracene, phenanthrene and carbazole, such as toluol, or benzol, could be used in place of the carbon tetrachloride, making suitable modification in the proportions used so as to employ a sufficient quantity of the particular solvent to dissolve all of the anthracene and phenanthrene and only a portion of the carbazole.

I claim:

1. A method for purifying carbazole, which involves treating it with a solvent in quantity sufficient to dissolve only a portion of the carbazole and substantially all of its impurities, and removing the resulting solution.

2. A method for purifying carbazole, which involves treating it with an organic solvent in quantity sufficient to dissolve only a minor portion of the carbazole and substantially all of its impurities, and removing the resulting solution.

3. A method for purifying carbazole, which involves treating it with a solvent in which the solubility of carbazole is less than that of anthracene and phenanthrene and with a quantity thereof sufficient to dissolve only substantially all of the said anthracene and phenanthrene, and removing the resulting solution.

4. A method for purifying carbazole, which involves a preliminary separation of same from a product containing it to provide the carbazole with impurities in minor proportions only, treating the separated impure carbazole with an organic solvent in quantity sufficient to dissolve only a minor portion of the carbazole and substantially all of the impurities, removing the resulting solution and recovering the dissolved substances and adding them to the next batch to be subjected to preliminary separation.

5. A method for purifying carbazole, which involves treating it with a sufficient quantity of carbon tetrachloride to dissolve all of its impurities but only a portion of the carbazole.

6. A method for purifying carbazole, which involves treating it with a sufficient quantity of carbon tetrachloride at 50° C. to dissolve all of its impurities but only a portion of the carbazole.

7. A method for purifying carbazole, which involves treating it with a sufficient quantity of carbon tetrachloride at 50° C. to dissolve all of its impurities but only a portion of the carbazole, and removing the resulting solution.

8. A method for purifying carbazole containing some ten (10%) per cent of anthracene and phenanthrene, which involves treating 100 parts of same with 800 to 1000 parts of carbon tetrachloride at a temperature of 50° C.

9. A method for purifying carbazole containing anthracene and phenanthrene, obtained by a preliminary separation of same from a product containing it, which consists in treating the separated carbazole with a sufficient quantity of carbon tetrachloride to dissolve substantially all of its impurities but only a minor portion of the carbazole, filtering off and cooling the resulting solution to crystallize out dissolved substances, and adding them to the next batch to be subjected to preliminary separation.

10. A method for purifying carbazole containing some ten (10%) per cent of anthracene and phenanthrene, obtained by a preliminary separation of same from a product containing it, which involves treating 100 parts of the separated carbazole with 800 to 1000 parts of carbon tetrachloride at a temperature of 50° C., filtering off and cooling the resulting solution to crystallize out dissolved substances, and adding them to the next batch to be subjected to preliminary separation.

11. A method for purifying carbazole containing some ten (10%) per cent of anthracene and phenanthrene, obtained by a preliminary separation of same from a product containing it, which involves treating 100 parts of the separated carbazole with 800 to 1000 parts of carbon tetrachloride at a temperature of 50° C., filtering off and cooling the resulting solution to crystallize out dissolved substances, adding them to the next batch to be subjected to preliminary separation, distilling the carbon tetrachloride and similarly adding all solid residue to the next batch to be subjected to preliminary separation.

Signed at New York in the county of New York and State of New York this 14th day of December, A. D. 1921.

CHARLES J. THATCHER.